United States Patent
Harada et al.

(10) Patent No.: US 8,502,947 B2
(45) Date of Patent: Aug. 6, 2013

(54) LIQUID CRYSTAL DISPLAY DEVICE

(75) Inventors: Kazuyuki Harada, Ishikawa-ken (JP);
Hiroyuki Kimura, Saitama-ken (JP);
Junichi Kobayashi, Ishikawa-ken (JP);
Masato Nakamura, Saitama-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 16 days.

(21) Appl. No.: 13/371,798

(22) Filed: Feb. 13, 2012

(65) Prior Publication Data
US 2012/0229745 A1  Sep. 13, 2012

(30) Foreign Application Priority Data
Mar. 10, 2011 (JP) .................. 2011-052752

(51) Int. Cl.
*G02F 1/1343* (2006.01)
(52) U.S. Cl.
USPC ............. 349/141; 349/84; 349/122; 349/123; 349/128; 349/139
(58) Field of Classification Search
USPC ............. 349/56, 84, 122, 123, 128, 139, 141, 349/147
See application file for complete search history.

(56) References Cited

U.S. PATENT DOCUMENTS

| | | | |
|---|---|---|---|
| 6,040,886 A * | 3/2000 | Ota et al. ................. | 349/141 |
| 7,436,472 B2 * | 10/2008 | Baek ...................... | 349/106 |
| 7,728,941 B2 * | 6/2010 | Jin et al. .................. | 349/141 |
| 2008/0218678 A1 | 9/2008 | Nakayama et al. | |
| 2009/0096946 A1 | 4/2009 | Harada | |
| 2009/0160748 A1 | 6/2009 | Kimura et al. | |
| 2010/0060814 A1 | 3/2010 | Harada et al. | |
| 2011/0109862 A1 | 5/2011 | Harada et al. | |
| 2011/0242469 A1 | 10/2011 | Kawamura et al. | |
| 2011/0310336 A1 | 12/2011 | Kobayashi et al. | |

FOREIGN PATENT DOCUMENTS

| | | |
|---|---|---|
| JP | 2010-256547 | 11/2010 |
| JP | 2011-18084 | 1/2011 |

* cited by examiner

*Primary Examiner* — Jennifer Doan
(74) *Attorney, Agent, or Firm* — Oblon, Spivak, McClelland, Maier & Neustadt, L.L.P.

(57) ABSTRACT

In one embodiment, a liquid crystal display device includes a first substrate and a second substrate. The first substrate includes a switching element, a first electrode, a second electrode electrically connected with the switching element and facing the first electrode. In the second electrode, a plurality of slits in a V shape is formed along a first direction. The first and second substrates include first and second alignment films, respectively. The slit in the V shape includes a central portion, a first end connected with one end of the first central portion, a second end connected with the other end of the first central portion, a second central portion, a third end connected with one end of the second central portion, and a fourth end connected with the other end of the second central portion. The first end and the third end are connected each other.

15 Claims, 7 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2011-052752,filed Mar. 10, 2011, the entire contents of which are incorporated herein by reference.

FIELD

Embodiments described herein relate generally to a liquid crystal display device.

BACKGROUND

Recently, flat display devices have been actively developed. Among others, liquid crystal display devices have attracted an attention due to their advantages such as lightness, thinness, and low power consumption. In particular, noteworthy configurations for an active matrix type liquid crystal display device incorporating a switching element in each pixel are those using a lateral electric field (including a fringe electric field) such as an IPS (In-Plane Switching) mode and FFS (Fringe Field Switching) mode. The liquid crystal display device in the lateral electric field mode includes pixel electrodes and counter electrodes formed in an array substrate, and performs switching of liquid crystal molecules using the lateral electric filed substantially parallel with a principal surface of the array substrate. Various techniques to switch liquid crystal molecules are proposed using the lateral electric field.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
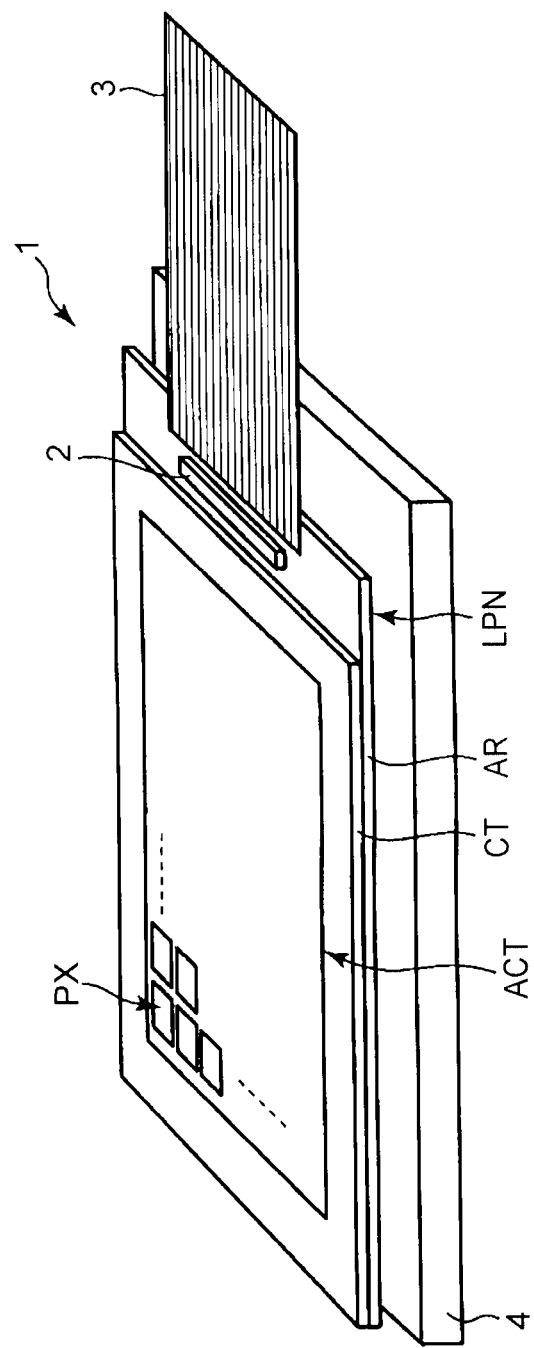
FIG. 1 is a figure schematically showing a structure of a liquid crystal display in an embodiment.

A liquid crystal display device according to an exemplary embodiment of the present invention will now be described with reference to the accompanying drawings wherein the same or like reference numerals designate the same or corresponding portions throughout the several views.

Here, one substrate is equipped with a first electrode and a second electrode as an example of a liquid crystal display device. The liquid crystal display device using FFS mode is explained as an example of the liquid crystal mode which switches liquid crystal molecules mainly using lateral electric field (namely, electric field almost parallel to a principal surface of the substrate) formed between the first electrode and the second electrode.

According to one embodiment, a liquid crystal display device includes: a first substrate including; a switching transistor having a semiconductor layer, a first insulating layer arranged on the switching transistor, a first electrode formed on the first insulating layer, a second insulating layer formed on the first electrode, a second electrode arranged on the second insulating layer facing the first electrode and electrically connected with the switching transistor, the second electrode having a plurality of slits in a V shape arranged along a first direction, a first alignment film covering the second electrode and processed by rubbing treatment in a first rubbing direction in parallel with a second direction orthogonally crossing the first direction, a second substrate including a second alignment film covering a surface thereof facing the first substrate and processed by the rubbing treatment in a second rubbing direction which is a reverse direction with respect to the first rubbing direction; and a liquid crystal layer held between the first substrate and the second substrate; wherein, the slit in the V shape includes; a first central portion that extends in a third direction crossing the second direction in a counterclockwise direction at an acute angle with reference to the second direction, a first end connected with one end of the first central portion and extending along a fourth direction that crosses the third direction in the counterclockwise direction at an acute angle, a second end connected with the other end of the first central portion and extending in the fourth direction, a second central portion extending in a fifth direction that crosses the second direction in a clockwise direction at an acute angle, a third end connected with one end of the second central portion and extending in a sixth direction that crosses the fifth direction in the clockwise direction at an acute angle, and a fourth end connected with the other end side of the second central portion and extending in the sixth direction, and the first end and the third end are connected.

FIG. 1 is a figure schematically showing the structure of the liquid crystal display device 1 according to this embodiment. The liquid crystal display device 1 is equipped with an active-matrix type liquid crystal display panel LP, a drive IC chip 2 connected to the liquid crystal display panel LPN and a flexible wiring substrate 3, and a back light 4, etc., which illuminates the liquid crystal display panel LPN The liquid crystal display panel LPN includes an array substrate AR which is the first substrate and a counter substrate CT which is the second substrate facing the array substrate AR, and a liquid crystal layer held therebetween (not illustrated). The liquid crystal display panel LPN is equipped with an active area ACT which displays an image. The active area ACT is constituted by a plurality of pixels PX arranged in the shape of (m×n) matrix (here, m and n are positive integers).

The back light 4 is arranged on the back side of the array substrate AR in the illustrated example. Various forms as a light source of the back light 4 such as light emitting diodes (LED), a cold cathode pipe (CCFL), etc., can be applied, and their explanation about the detailed structure is omitted.

Figure 2:
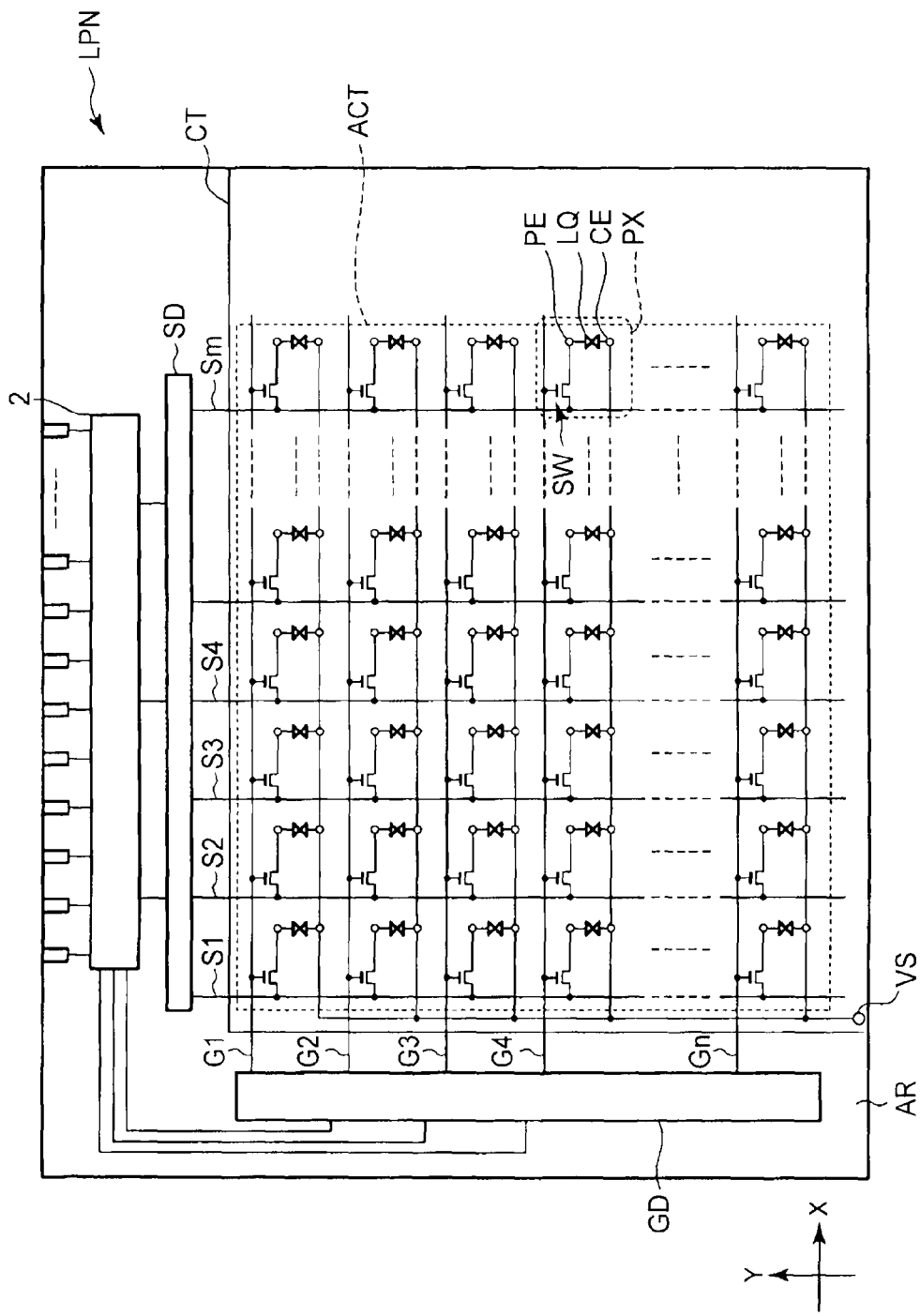
FIG. 2 is a figure schematically showing the structure and equivalent circuit of a liquid crystal display panel shown in FIG. 1.

FIG. 2 is a figure schematically showing the structure and the equivalent circuit of the liquid crystal display panel LPN shown in FIG. 1.

The liquid crystal display panel LPN is equipped "n" gate lines G (G1-Gn), "m" source lines S (S1-Sm), etc., in the active area ACT. Each of the gate lines G extends along a first direction X, respectively. The gate lines G are arranged in parallel each other in a second direction Y which perpendicularly intersects the first direction X. Each of the source lines S extends, respectively so as to intersect the gate lines G. Moreover, the source lines S are arranged along the second direction Y.

Each gate line G is pulled out to the outside the active area ACT, and is connected to a gate driver GD. Each source line S is pulled out to the outside the active area ACT, and is connected to a source driver SD. At least a portion of the gate driver GD and the source driver SD is formed in the array substrate AR, and is connected with the drive IC chip 2 built in the controller, for example.

Each pixel PX is equipped with a switching element SW, a pixel electrode (the second electrode) PE, the counter electrode (the first electrode) CE, etc.

In addition, in this embodiment, the pixel electrode PE and the counter electrode CE are formed in the array substrate AR, and the liquid crystal display panel LPN switches the liquid crystal molecules of the liquid crystal layer LQ, mainly using electric field formed between the pixel electrodes PE and the counter electrodes CE. Electric field formed between the pixel electrode PE and the counter electrode CE is lateral electric field approximately parallel to a principal surface of the array substrate AR, or a principal surface of the counter substrate CT.

The switching element SW is constituted by an n channel type thin film transistor (TFT), for example. In addition, although not explained in detail here, the switching element SW according to this embodiment adopts a double-gate type structure equipped with a poly-silicon semiconductor layer. The switching element SW is electrically connected with the gate line G and the source line S. The (m×n) switching elements SW are formed in the active area ACT.

The pixel electrode PE is electrically connected with the switching element SW. The (m×n) pixel electrodes PE are formed in the active area ACT. The counter electrode CE is set to be a common potential, for example. The counter electrode CE is electrically connected with an electric supply portion VS formed in array substrate AR.

The structure of the pixel in this embodiment is explained more practically.

Figure 3:
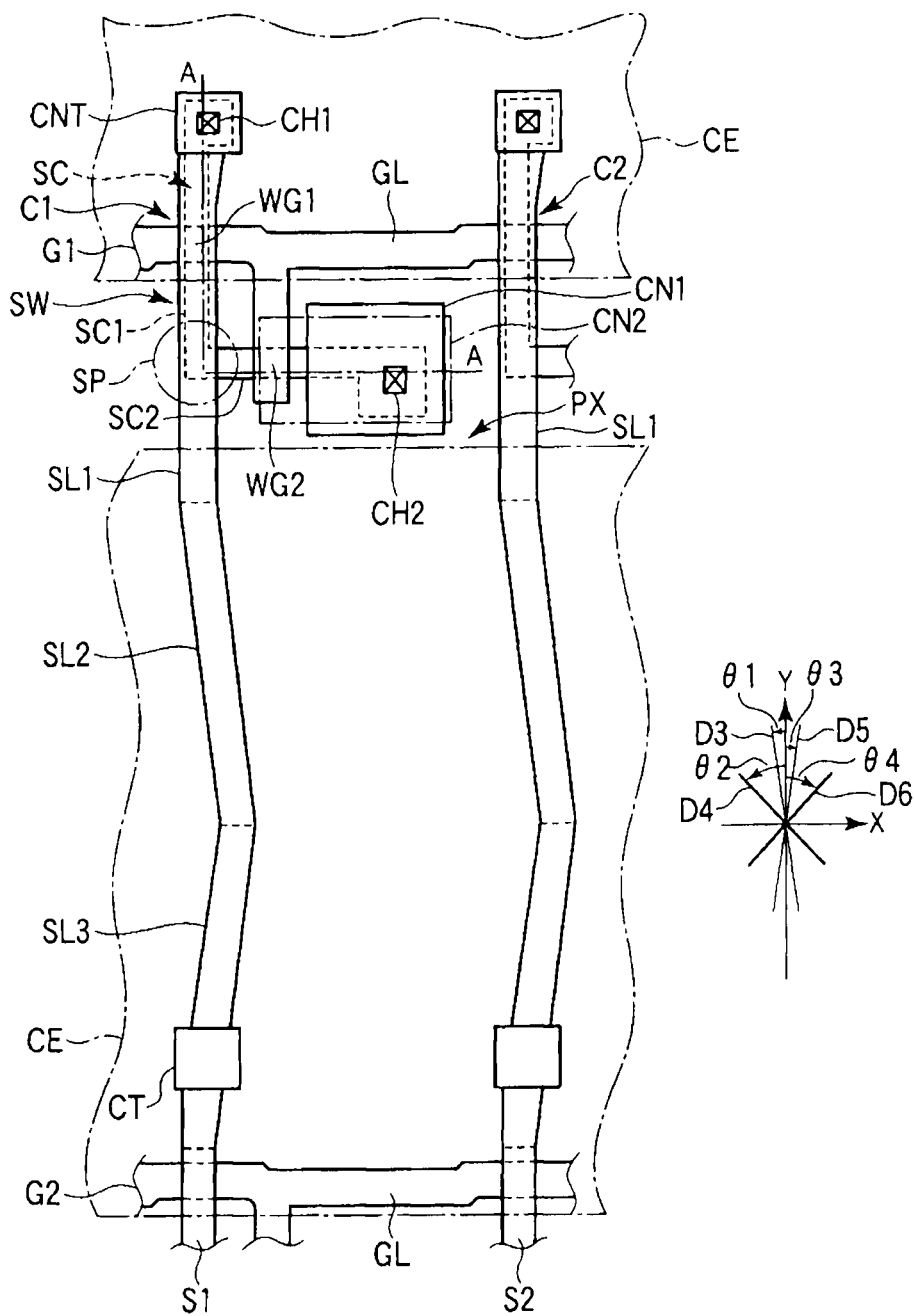
FIG. 3 is a plan view schematically showing the structure of an array substrate when a pixel of the liquid crystal display panel shown in FIG. 2 is seen from a counter substrate side.

FIG. 3 is a plan view schematically showing the structure of the array substrate AR when the pixel PX of the liquid crystal display panel LPN shown in FIG. 2 is seen from the counter substrate CT side. In addition, only the structure required for explanation is illustrated here, and the structure from a lower layer of the counter electrode CE corresponding to the first electrode to a layer in which the poly-silicon semiconductor layer SC is formed is illustrated here.

Moreover, in the following explanation, the first direction X and the second direction Y intersect perpendicularly. A direction that crosses the second direction Y at an acute angle in a counterclockwise direction is set to a third direction D3, a direction that crosses the third direction D3 in the counterclockwise direction at an acute angle is set to a fourth direction D4, a direction that crosses the second direction Y in a clockwise direction at an acute angle is set to a fifth direction D5, and a direction that crosses the fifth direction D5 in the counterclockwise direction at an acute angle is set to a sixth direction D6. Although mentioned later, in this embodiment, the direction of initial alignment of the liquid crystal molecule LM is in parallel with the second direction Y, for example.

It is preferable that the third direction D3 and the fifth direction D5 are symmetrically set with respect to the second direction Y, i.e., the initial alignment direction. That is, the angle θ1 between the second direction Y and the third direction D3 is substantially the same as the angle θ3 between the second direction Y and the fifth direction D5, and is larger than 0° and smaller than 45°. About the angles θ1 and θ3, it is very effective to set the angles to be 5° to 25°, more preferably around 10°, in the viewpoint of the control for alignment of the liquid crystal molecule LM.

It is preferable that the fourth direction D4 and the sixth direction D6 are symmetrically set with respect to the second direction Y, i.e., the initial alignment direction. That is, the angle θ2 between the second direction Y and the fourth direction D4 is larger the angle θ1 and smaller than 90°. The angle θ4 between the second direction Y and the sixth direction D6 is larger than the angle θ3 and smaller than 90°. The angle θ2 is approximately the same as the angle θ4.

The poly-silicon semiconductor layer SC of the switching element SW is formed in a L character shape. That is, the poly-silicon semiconductor layer SC has a first straight line portion SC1 which extends along the second direction Y and a second straight line portion SC2 which extends along the first direction X. Here, only the poly-silicon semiconductor layer SC of one pixel PX is illustrated.

Gate lines G1 and G2 extend along the first direction X, respectively. The gate line G1 is located in the upper portion in the illustrated pixel PX, and is connected to the switching element SW of the pixel PX. The gate line G2 is located in the under portion of the pixel and connected to the switching element of another pixel (not illustrated) which is located adjacent to the pixel PX in the second direction Y.

Each of source lines S1 and S2 is bended in a V character shape at one portion. The source line S1 is located in the left-hand side of the illustrated pixel PX, and is connected to the switching element SW of the pixel PX. The source line S2 is connected to the switching element of an adjacent pixel (not shown) which is located in the right-hand side of the pixel PX in the first direction X.

The gate line G1 includes a first gate electrode WG1 crossing the first straight line portion SC1 of the poly-silicon semiconductor layer SC and a second gate electrode WG2 crossing the second straight line portion SC2 of the poly-silicon semiconductor layer SC. Moreover, the gate line G1 includes a wiring portion GL projected toward the pixel PX side between an intersection portion C1 at which the gate line G1 intersects the source line S1 and an intersection portion C2 at which the gate line G1 intersects the source line S2. The wiring portion GL extends along the first direction X. In addition, the wiring portion GL of the gate line G2 is projected toward the adjacent pixel in the second direction Y.

Since the structure of other gate lines is the same as the gate line G1, illustration and explanation are omitted about identical configuration of other gate lines.

The source line S1 includes a contact portion CNT which contacts the poly-silicon semiconductor layer SC through a contact hole CH1. Moreover, the source line S1 includes a first wiring portion SL1, a second wiring portion SL2, and a third wiring portion SL3.

The first wiring portion SL1 extends along the second direction Y, and intersects the gate line G1. The first wiring portion SL1 is located also on the first straight line portion SC1 of the poly-silicon semiconductor layer SC. The second wiring portion SL2 extends along the third direction D3. The third wiring portion SL3 extends along the fifth direction D5. In addition, the contact portion CNT is included in the first wiring portion SL1. The contact portion CNT is in contact with one end of the first straight line portion SC1 which is one end of the poly-silicon semiconductor layer SC.

In the example shown here, the second wiring portion SL2 is located between the first wiring portion SL1 and the third wiring portion SL3, and its both ends are connected with the first wiring portion SL1 and the third wiring portion SL3. For this reason, the second wiring portion SL2 and the third wiring portion SL3 make a V character shape. In addition, when the third wiring portion SL3 is located between the first wiring portion SL1 and the second wiring portion SL2 and its both ends of the third wiring portion SL3 are connected with the first wiring portion SL1 and the second wiring portion SL2, the second wiring portion SL2 and the third wiring portion SL3 make the V character shape in a reverse direction to the example shown in FIG. 3.

Since the structure of other source lines is the same as the structure of the source line S1, the illustration and explanation are omitted.

The first connection electrode CN1 is in contact with the poly-silicon semiconductor layer SC through a contact hole CH2. The first connection electrode CN1 is located between the first wiring portion SL1 of the source line S1 and first wiring portion SL1 of the source line S2. More specifically, the first connection electrode CN1 is arranged in a region surrounded by the wiring portion GL of the gate line G1, the second gate electrode WG2, and the first wiring portion SL1 of the source line S2. The first connection electrode CN1 is in contact with the end of second straight line portion SC2 which is the other end of the poly-silicon semiconductor layer SC.

A pillar-shaped spacer SP is located on an intersection portion in which the first straight line portion SC1 intersects the second straight line portion SC2 of the poly-silicon semiconductor layer SC.

The counter electrode CE is arranged so that the counter electrode CE is located on the second wiring portion SL2 and third wiring portion SL3 of the source line S1 and extends in the first direction X. The second connection electrode CN2 is arranged on the first connection electrode CN1, and is separated from the counter electrode CE.

Figure 4:
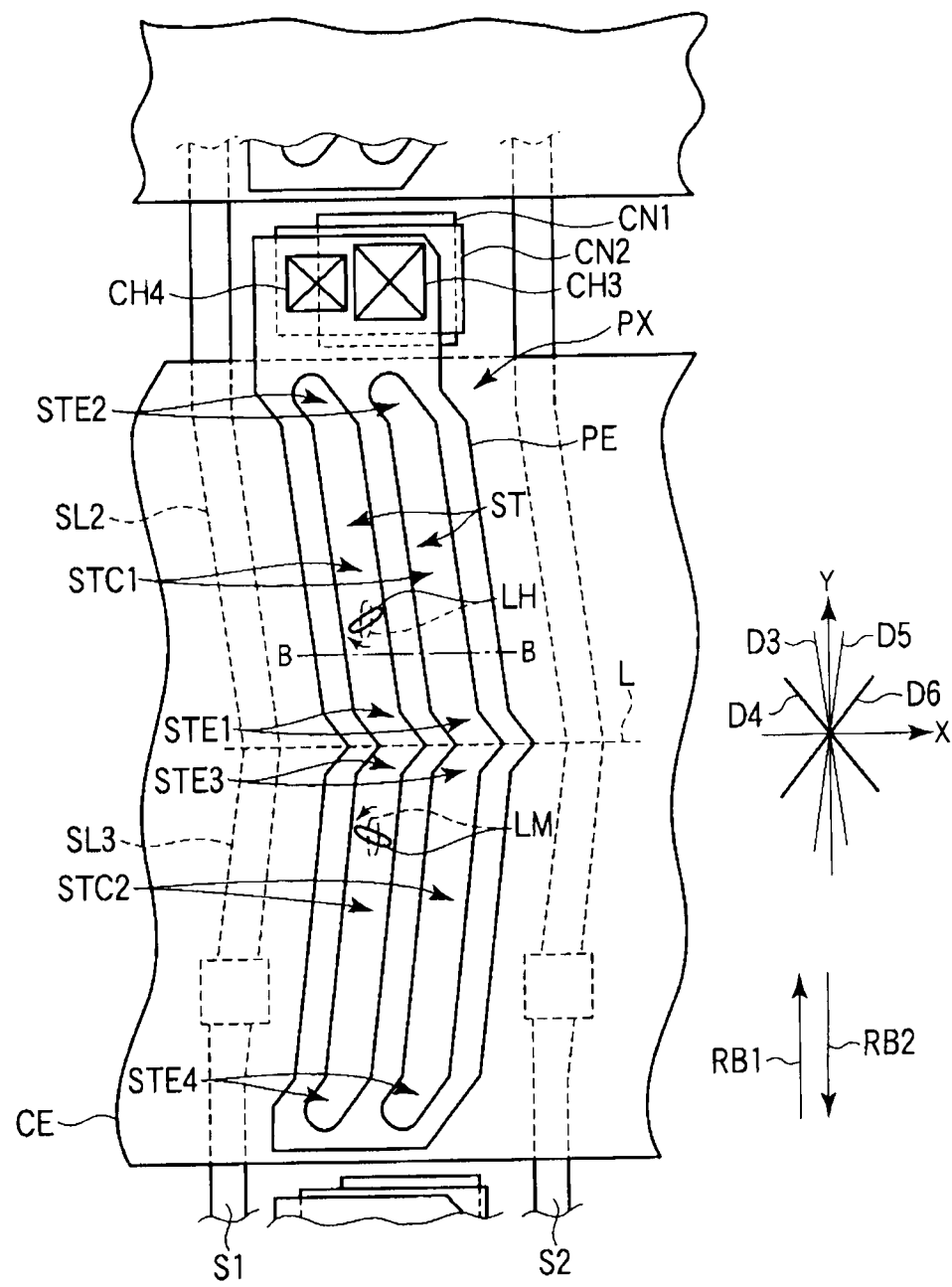
FIG. 4 is a plan view schematically showing the structure of the array substrate when the pixel of the liquid crystal display panel shown in FIG. 2 is seen from the counter substrate side.

FIG. 4 is a plan view schematically showing the structure of the array substrate AR when the pixel PX of the liquid crystal display panel LPN shown in FIG. 2 is seen from the counter substrate CT side. In addition, only the structure required for explanation is illustrated, and the structure from the layer in which the pixel electrode PE (the second electrode) to the layer in which the source line S1, etc., is formed is illustrated here.

The second connection electrode CN2 of the switching element which is not illustrated is electrically connected with the first connection electrode CN1 through a contact hole CH3. The pixel electrode PE is electrically connected with the second connection electrode CN2 through a contact hole CH4.

A plurality of slits ST in a V character shape is formed in the pixel electrode PE. The slits ST are formed side by side along the first direction X while facing the counter electrode CE. Two slits ST are formed in the pixel electrode PE of the pixel PX in the illustrated example.

Each of the slits ST has the same form, and its form is explained specifically hereinafter. The slit ST includes a first central portion STC1, a second central portion STC2, a first end STE1, a second end STE2, a third end STE3, and a fourth end STE4.

The first central portion STC1 extends along the third direction D3. The first central portion STC1 is formed along with the second wiring portion SL2 of the source line S1. The first end STE1 is connected with one end side (center side of pixel PX) of the first central portion STC1, and extends along the fourth direction D4. The second end STE2 is connected with the other end side (upper side of pixel PX) of the first central portion STC1, and extends along the fourth direction D4. Moreover, the tip of the second end SET2 is formed in a rounded shape. In the illustrated example, the first central portion STC1, the first end STE1, and the second end STE2 are located in the upper half portion of the pixel PX, and they make a shape of a reverse S character.

The second central portion STC2 extends along the fifth direction D5. The second central portion STC2 is formed along with a third wiring portion SL3 of the source line S1. The third end STE3 is connected with one end side (center side of pixel PX) of the second central portion STC2, and extends along the sixth direction D6. The fourth end STE4 is connected with the other end side (under side of pixel PX) of the second central portion STC2, and extends along the sixth direction D6. Moreover, the tip of the fourth end SET4 is formed in a rounded shape. In the illustrated example, the second central portion STC2, the third end STE3, and the fourth end STE4 are located in the under half portion of the pixel PX, and they make the shape of S character.

The V character shape slit ST is formed by connecting the first end STE1 located in the upper half portion of the pixel PX and making the reverse S character shape, and the third end STE3 located in the under half portion of the pixel PX and making the S character shape in the center of the pixel PX. In the slit ST, an apex angle formed between the first end STE1 and the third end STE3 is located on a straight line L parallel to the first direction X as illustrated. That is, a plurality of slits ST of the pixel electrode PE is formed so that each apex angle is located on the same straight line L.

Figure 5:
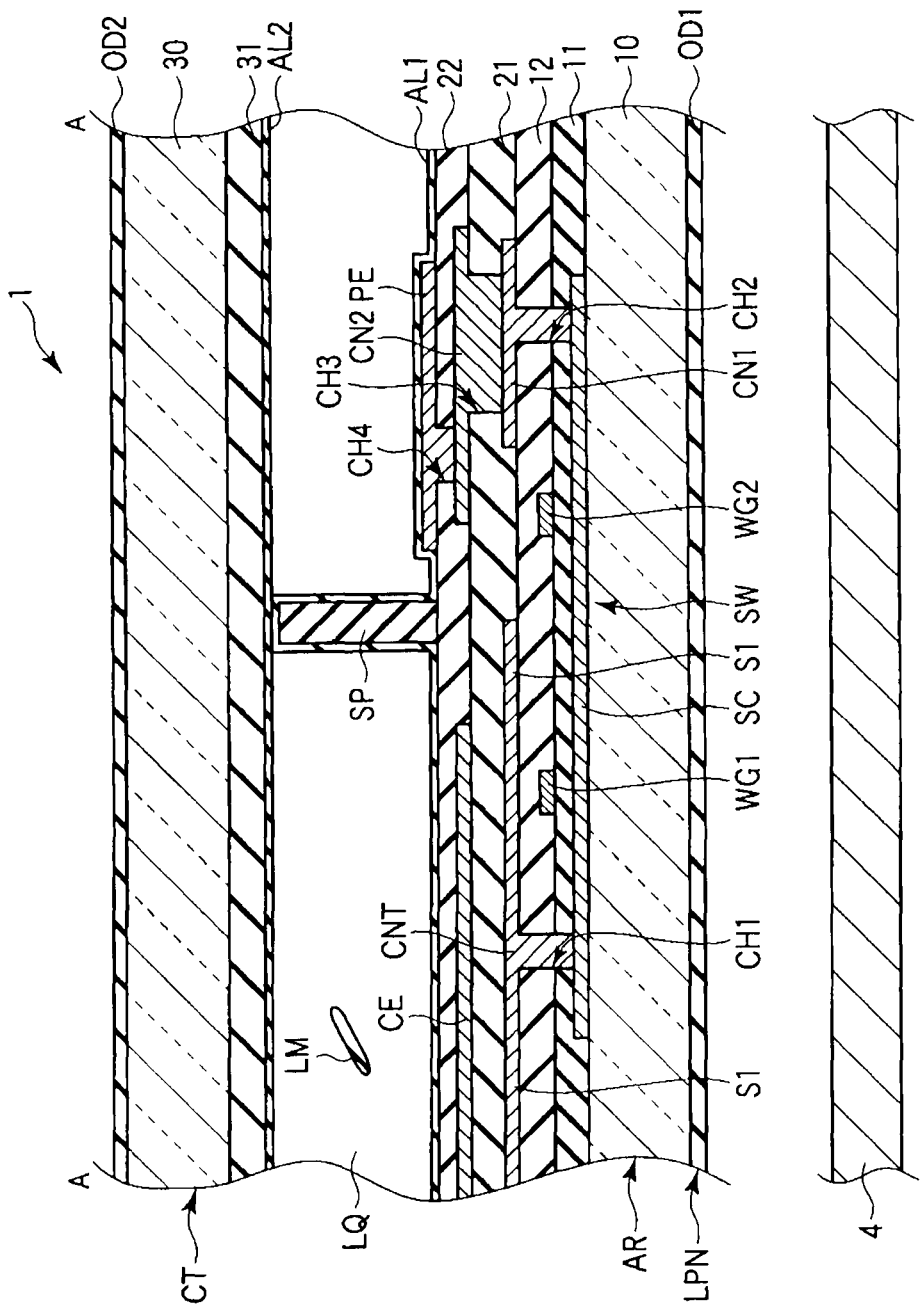
FIG. 5 is a schematic sectional view of the liquid crystal display device taken along line A-A shown in FIG. 3.

Next, the structure of the liquid crystal display 1 in this embodiment is explained in detail hereinafter. FIG. 5 is a schematic sectional view of the liquid crystal display 1 taken along line A-A shown in FIG. 3.

The array substrate AR is formed using a first insulating substrate 10 with light transmissive characteristics, such as a glass substrate and a plastic substrate. The array substrate AR is equipped with the switching element SW, the pixel electrode PE, and the first alignment film AL1, etc., on the side which faces the counter substrate CT of the first insulating substrate 10.

The switching element SW shown here is a thin film transistor of a top-gated type or a double-gated type. The poly-silicon semiconductor layer SC of the switching element SW is arranged on a first insulating substrate 10. The poly-silicon semiconductor layer SC is covered with a gate insulating film 11. Moreover, the gate insulating film 11 is arranged also on the first insulating substrate 10. In addition, an undercoat layer may be formed using an insulating film between the first insulating substrate 10 and the poly-silicon semiconductor layer SC.

The first gate electrode WG1 and the second gate electrode WG2 of the switching element SW are arranged on the gate insulating film 11, and are located on the poly-silicon semiconductor layer SC. The first gate electrode WG1 and second gate electrode WG2 are covered with an interlayer insulating film 12. Moreover, the interlayer insulating film 12 is arranged also on the gate insulating film 11. In addition, the gate line which is not illustrated is also arranged on the gate insulating film 11, and is covered with the interlayer insulating film 12.

The first gate electrode WG1 and the second gate electrode WG2, and the gate line are formed of electric conductive materials, such as molybdenum (Mo) and tungsten (W), for example. Accordingly, the gate line functions also as a light blocking layer which shades between the adjacent pixels PX in the second direction Y.

The source line S1 with the contact portion CNT and the first connection electrode CN1 are arranged on the interlayer insulating film 12. The contact portion CNT is in contact with the poly-silicon semiconductor layer SC through the contact hole CH1 which penetrates the gate insulating film 11 and the interlayer insulating film 12. The first connection electrode CN1 is in contact with the poly-silicon semiconductor layer SC through the contact hole CH2 which penetrates the gate insulating film 11 and the interlayer insulating film 12.

The source line S1 and first connection electrode CN1 are formed of electric conductive materials, such as aluminum (AL) and titanium (Ti), for example. For this reason, the source line functions also as a light blocking layer which shades between the pixels which adjoin in the first direction X.

The source line S1 and the first connection electrode CN1 are covered with the first insulating film 21. Moreover, this first insulating film 21 is arranged also on the interlayer insulating film 12. The first insulating film 21 is formed of a transparent resin material, for example.

The counter electrode CE and the second connection electrode CN2 are arranged on the first insulating film 21. The second connection electrode CN2 is electrically connected with the first connection electrode CN1 through the contact hole CH3 which penetrates the first insulating film 21. The counter electrodes CE and the second connection electrode CN2 are formed of the electric conductive material with light transmissive characteristics, such as Indium Tin Oxide (ITO) and Indium Zinc Oxide (IZO), for example.

The counter electrodes CE and the second connection electrode CN2 are covered with the second insulating film 22. Moreover, the second insulating film 22 is arranged also on the first insulating film 21. A second insulating film 22 is formed of inorganic system materials, such as nitride silicon (SiN), for example.

The pixel electrode PE is arranged on the second insulating film 22. This pixel electrode PE is electrically connected with the second connection electrode CN2 through a contact hole CH4 which penetrates the second insulating film 22. The pixel electrode PE is formed of the electric conductive material with light transmissive characteristics, such as ITO and IZO, for example.

A pillar-shaped spacer SP is formed on the second insulating film 22. The pillar-shaped spacer SP is formed of resin material, for example.

The pixel electrode PE, the pillar-shaped spacer SP, and the second insulating film 22 are covered with the first alignment film AL1. Rubbing processing of the first alignment film AL1 is carried out in a first rubbing direction RB. Here, the first rubbing direction RB is in parallel to the second direction Y. The first alignment film AL1 is formed with polyimide (PI), for example.

On the other hand, the counter substrate CT is formed using a second insulating substrate 30 with light transmissive characteristics, such as a glass substrate and a plastic substrate. The counter substrate CT is equipped with a black matrix 31 and a second alignment film AL2 formed facing the array substrate AR on the second insulating substrate 30.

The black matrix 31 is arranged on the second insulating substrate 30 so that the black matrix 31 is located above the gate line, the source line, the switching element SW, etc. The black matrix 31 is formed of metal material, that is, chromium (Cr), etc., or resin material with the light blocking effect which is colored in black.

The black matrix 31 is covered with the second alignment film AL2 in the illustrated example. The rubbing processing of the second alignment film AL2 is carried out in the second rubbing direction RB2. Here, the second rubbing direction RB 2 is in parallel to the second direction Y, and a reverse direction with respect to the first rubbing direction RB1. The second alignment film AL2 is formed with polyimide (PI), for example.

The array substrate AR and the counter substrate CT as mentioned above are arranged so that the first alignment film AL1 faces the second alignment film AL2 each other. At this time, a predetermined cell gap is formed by the pillar-shaped spacer SP between the array substrate AR and the counter substrate CT. The array substrate AR and the counter substrate CT are pasted together by a seal material which is not illustrated. Thereby, a predetermined cell gap is formed.

The liquid crystal layer LQ is held in the cell gap formed between the array substrate AR and the counter substrate CT, and is arranged between the first alignment film AL1 and the second alignment film AL2. The liquid crystal layer LQ includes the liquid crystal molecule LM. The liquid crystal layer LQ is constituted by positive type liquid crystal material.

A first optical element OD1 is attached on the external surface of the array substrate AR, i.e., the external surface of the first insulating substrate 10 which constitutes the array substrate AR by adhesives, etc. Moreover, a second optical element OD2 is attached on the external surface of the counter substrate CT, i.e., the external surface of the second insulating substrate 30 which constitutes the counter substrate CT by adhesives, etc.

The first optical element OD1 includes a first polarizing plate PL1 which has a first polarization axis. The first polarization axis is set up in parallel with the first direction X, for example. The second optical element OD2 includes a second polarizing plate PL2 which has a second polarization axis. The second polarization axis is set up in parallel with the second direction Y, for example, and intersects perpendicularly with the first polarization axis.

Figure 6:
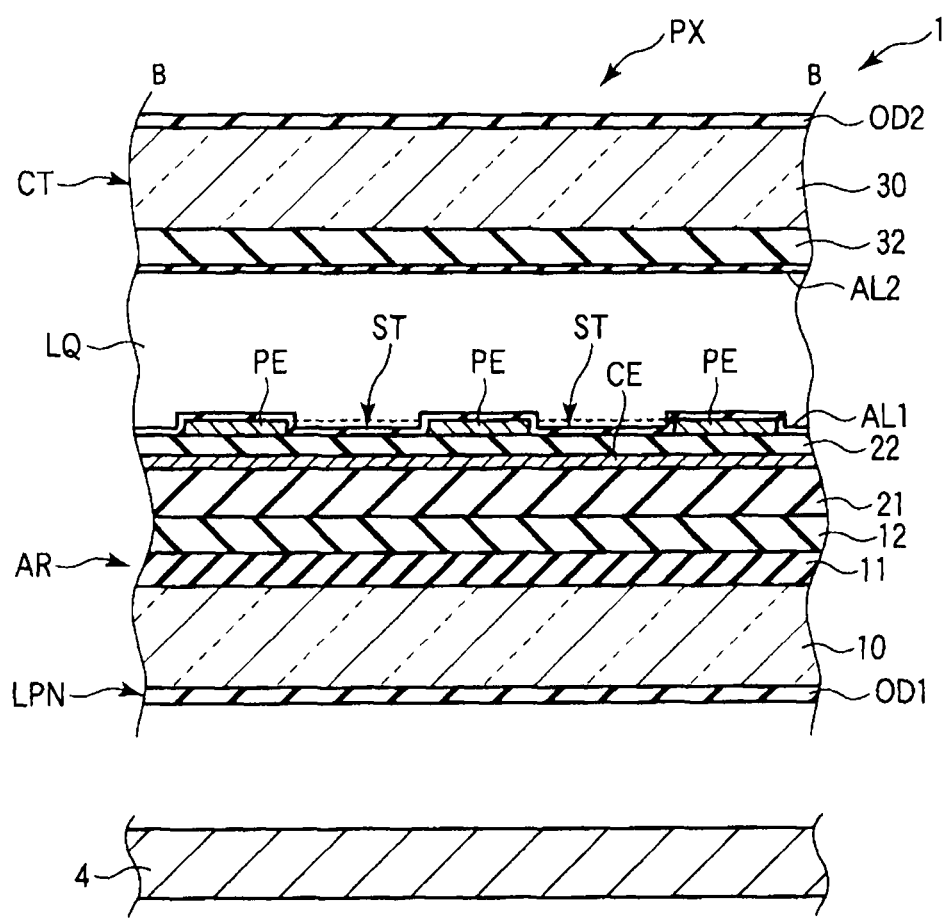
FIG. 6 is a schematic sectional view of the liquid crystal display device taken along line B-B shown in FIG. 4.

FIG. 6 is a schematic sectional view of the liquid crystal display 1 taken along line B-B in FIG. 4. The region shown in FIG. 6 substantially corresponds to a pixel aperture which contributes to the display. In addition, the same referential mark is given to the structure explained with reference to FIG. 5, and detailed explanation is omitted here.

In the array substrate AR, the pixel electrode PE arranged on the second insulating film 22 faces the counter electrode CE arranged under the second insulating film 22. A plurality of slits ST is formed in the pixel electrode PE. As a matter of course, the slits ST also face the counter electrode CE. The slits ST penetrate the pixel electrode PE to the second insulating film 22. The first alignment film AL1 covers the second insulating film 22 exposed through the slit ST while covering the pixel electrode PE.

The counter substrate CT is equipped with a color filter 32 and the second alignment film AL2 formed on the second insulating substrate 30 facing the array substrate AR. Although not explained in detail, the color filter 32 includes a red color filter arranged corresponding to a red pixel, a blue color filter arranged corresponding to a blue pixel, and a green color filter arranged corresponding to a green picture element. The red color filter, the blue color filter, and the green color filter are formed of resin materials colored in each color.

In the liquid crystal mode using the lateral electric field mentioned above, it is preferable that the surface of the counter substrate CT contacting the liquid crystal layer LQ is formed smoothly. Therefore, the counter substrate CT may be further equipped with an overcoat layer of comparatively thick between the black matrix 31 and the color filter 32, and the second alignment film AL2. The overcoat layer is formed of a transparent resin material, for example.

In this embodiment, the normally black mode is achieved when potential difference is not formed between the pixel electrode PE and the counter electrode CE i.e., the voltage is not impressed therebetween, in which the transmissivity of the liquid crystal display panel LPN becomes the minimum (a black screen is displayed)

Namely, in the liquid crystal display 1, when the voltage is not applied to the liquid crystal layer, each of the liquid crystal molecules LM is aligned so that its long axis of the liquid crystal molecule may turn to the second direction Y in parallel to the first rubbing direction RB and the second rubbing direction RB according to regulation power for alignment by the first alignment film AL1 and the second alignment film AL2 (see the liquid crystal molecule LM shown by the dotted line of FIG. 3). That is, in the example shown here, the initial alignment direction of the liquid crystal molecule LM is the second direction Y. In such a state, after the light from the back light 4 passes the optical element OD1, the light passes the liquid crystal display panel LPN, and is absorbed by the optical element OD2 (black display).

On the other hand, in this liquid crystal display 1, the lateral electric field (fringe electric field) is formed between the pixel electrode PE and the counter electrode CE at the time when the voltage is impressed to the liquid crystal layer LQ. This lateral electric field is mainly formed in the direction which intersects perpendicularly with the long axis of the slit ST through the slit ST.

In this time, the state of the alignment of the liquid crystal molecule LM changes so that its long axis of the liquid crystal molecule LM turns to a parallel direction with the lateral electric field from the initial alignment direction. In the example shown in FIG. 4, the liquid crystal molecule LM located in a region in the upper half portion rotates from the initial alignment direction in a clockwise direction as shown by the dotted line, and is aligned approximately in a parallel direction with the lateral direction. The liquid crystal molecule LM located in a region in the under half portion rotates from the initial alignment direction in a counterclockwise direction as shown by the dotted line, and is aligned in a parallel direction with the lateral electric field. Since the directions for alignment of the liquid crystal molecules LM differ between in the regions in the upper half portion and in the lower half portion of the pixel PX, it becomes possible to form a multi-domain in one pixel.

Thus, if the direction for alignment of the long axis of the liquid crystal molecule LM changes from the initial alignment direction, a modulation rate to the light which passes the liquid crystal layer LQ changes. For this reason, a portion of the back light which is emitted from the back light 4 and passes the liquid crystal display panel LPN passes the second optical element OD2 (white display). That is, the transmissivity of the liquid crystal display panel LPN changes depending on the strength of the lateral electric field. In the liquid crystal mode using the lateral electric field, the light from the back light passes selectively, and images are displayed.

Since it becomes possible to form a multi-domain according to this embodiment, the viewing angle in a plurality of directions can be compensated optically, and wide viewing is attained. Therefore, it becomes possible to offer a high quality liquid crystal display device.

Moreover, in the pixel according to this embodiment, the switching element SW is equipped with the poly-silicon semiconductor layer SC, and signal voltage is written in the pixel electrode PE through the switching element SW. Since the poly-silicon semiconductor layer SC has higher mobility as compared with the amorphous silicon semiconductor layer, it becomes possible to increase the response speed. Moreover, since the switching element SW is constituted by the thin film transistor of double gate structure, it becomes possible to fully reduce OFF current.

Moreover, with respect to the slit ST formed in the pixel electrode PE, the first end STE1 of the slit formed in the upper half portion of the pixel PX is connected with the third end STE3 of the slit formed in the under half portion of pixel PX, and thereby they form an apex angle. At this time, the angle $\theta 2$ between the fourth direction D4, which is an extending direction of the first end STE1, and the second direction Y that is the initial alignment direction of the liquid crystal molecule LM is larger than the angle $\theta 1$ between the third direction D3 in which the first central portion STC1 connected with the first end STE1 extends and the second direction Y. Moreover, the angle $\theta 2$ between the fourth direction D4 in which the second end STE2 extends, and the second direction Y that is the initial alignment direction of the liquid crystal molecule LM is larger than the angle $\theta 1$ between the third direction D3 in which first central portion STC1 connected to the second end STE2 extends and the second direction Y.

Similarly, the angle $\theta 4$ between the sixth direction D6 in which the third end STE3 extends and the second direction Y that is the initial alignment direction of the liquid crystal molecule LM is larger than the angle $\theta 3$ between the fifth direction D5 in which the second central portion STC2 connected with the third end STE3 extends and the second direction Y. Moreover, the angle $\theta 4$ between the sixth direction D6 in which the fourth end STE4 extends and the second direction Y that is the initial alignment direction of the liquid crystal molecule LM is larger than the angle $\theta 3$ between the fifth direction D5 in which the second central portion STC2 connected with the fourth end STE4 extends and the second direction Y.

For this reason, when potential difference is formed between the pixel electrode PE and the counter electrode CE, electric field is generated in the direction which intersects perpendicularly with each of the first end STE1, the second end STE2, the third end STE3, and the fourth end SET4. Therefore, in the end of the slit, since the direction in which the electric field is generated, and the initial alignment direction of the liquid crystal molecule LM do not intersect perpendicularly, the direction in which the liquid crystal molecule is aligned is uniformly decided by electric field generated between the pixel electrode PE and the counter electrode CE. Accordingly, the alignment direction of the liquid crystal molecules LM in the vicinity of the first central portion STC1, in the vicinity of the first end STE1, in the vicinity of the second end STE2, in the vicinity of the third end STE3, in the vicinity of the second central portion STC2, and in the vicinity of the fourth end STE4 changes contiguously. Since, especially, the tip portions of the second end STE2 and the fourth end STE4 are rounded, the electric field direction also changes contiguously along the rounded curve. Furthermore, since the alignment direction is decided uniformly, the liquid crystal molecules LM change continuously from near the pixel center to the end of the slit. Thus, near the slit ST, since it becomes possible to maintain the continuity of the alignment of the liquid crystal molecule LM, generating of the disclination near the center portion and the end portion of the pixel PX is controlled. Therefore, it becomes possible to suppress of reduction of the transmissivity in each pixel PX to the minimum.

Moreover, the gate line G1 located in the upper side portion of the pixel PX includes the wiring portion GL projected toward the pixel PX between intersection portions with the source line S1 and S2. Similarly, the gate line G2 located in the under portion of the pixel PX includes the wiring portion GL projected to the adjacent pixel PX in the second direction Y. For this reason, in the pixel PX, a region in which the pixel electrode PE is arranged can be expanded as compared with the case where the gate line is formed in the shape of a straight line, and it becomes possible to expand the area of the pixel aperture which contributes to the display.

Therefore, a high definition display is attained while controlling the reduction of transmissivity.

In particular, the high definition characteristics is demanded for personal digital assistant devices such as a cellular phone and PDA (personal digital assistant) while being compact. The liquid crystal display device according to this embodiment is suitable for a compact display device in which the pixel size is very small because the high definition display is achieved while suppressing the reduction of the transmissivity.

Next, the modification of this embodiment is explained.

Figure 7:
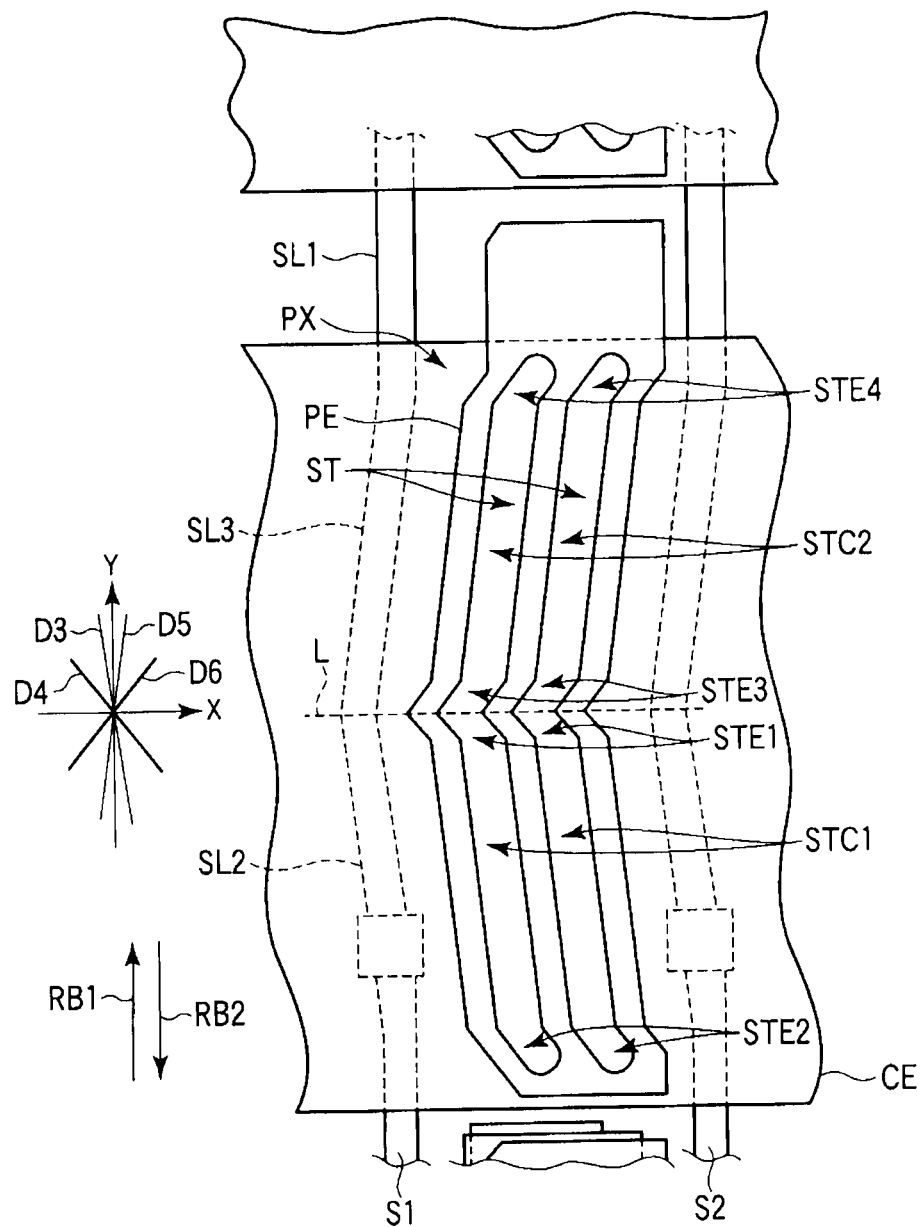
FIG. 7 is a plan view schematically showing other structure of the array substrate when the pixel of the liquid crystal display panel shown in FIG. 2 is seen from the counter substrate side.

FIG. 7 is a plan view schematically showing another structure of the array substrate AR when the pixel PX of the liquid crystal display panel LPN shown in FIG. 2 is seen from the counter substrate CT side. In addition, only the structure required for explanation is illustrated, and the structure from the layer in which the pixel electrode PE which is the second electrode to the layer in which the source line S1, etc., is formed is illustrated here.

In the source line S1, the third wiring portion SL3 is located between the first wiring portion SL1 and the second wiring portion SL2, and the both ends of the third direction wiring portion SL3 are connected with the first wiring portion SL1 and the second wiring portion SL2. In this case, the second wiring portion SL2 and the third wiring portion SL3 make a shape of V character in a reverse direction with respect to the example shown in FIG. 3. The structure for other source lines is the same as the source line S1.

The slit ST formed in the pixel electrode PE has a first central portion STC1, a second central portion STC2, a first end STE1, a second end STE2, a third end STE3, and a fourth end STE4. The example shown in FIG. 7 is different from the example shown in FIG. 4 in that the first central portion STC1, the first end STE1, and the second end STE2 are located in the under half portion of the pixel PX, and the second central portion STC2, the third end STE3, and the fourth end STE4 are located in the upper half portion of the pixel PX.

The first central portion STC1 extends along the third direction D3. The first end STE1 is connected with one end side (center side of pixel PX) of the first central portion STC1, and extends along the fourth direction D4. The second end STE2 is connected with the other end side (under side of pixel PX) of the first central portion STC1, and extends along the fourth D4 direction. The first central portion STC1, the first end STE1, and the second end STE2 make a shape of a reverse S character.

The second central portion STC2 extends along the fifth direction D5. The third end STE3 is connected with one end side (center side of pixel) of the second central portion STC2, and extends along the sixth direction D6. The fourth direction end STE4 is connected with the other end side (upper side of pixel PX) of the second central portion STC2, and extends along the sixth direction D6. The second central portion STC2, the third end STE3, and the fourth end STE4 make the shape of S character.

The slit ST of the V character shape is formed by connecting the first end STE1 located in the under half portion of the pixel PX and in the reverse S character shape, and the third end STE3 located in the upper half portion of the pixel PX and in the S character shape in the central portion of the pixel PX. The slit ST is formed in a shape of the reverse V character with respect to the example shown in FIG. 4.

Also in the modification, when the initial alignment direction of the liquid crystal molecule LM is made into a parallel direction to the second direction Y, the same effect as the example mentioned above is acquired.

As mentioned above, according to this embodiment, while improvement in the response speed is possible, the liquid crystal display with high definition characteristics can be offered while suppressing the reduction of transmissivity.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the inventions.

What is claimed is:

1. A liquid crystal display device, comprising:
a first substrate including;
    a switching element having a semiconductor layer,
    a first insulating layer arranged on the switching element,
    a first electrode formed on the first insulating layer,
    a second insulating layer formed on the first electrode,
    a second electrode arranged on the second insulating layer facing the first electrode and electrically connected with the switching element, the second electrode having a plurality of slits in a V shape arranged along a first direction,
    a first alignment film covering the second electrode and processed by rubbing treatment in a first rubbing direction in parallel with a second direction orthogonally crossing the first direction,
a second substrate including a second alignment film covering a surface thereof facing the first substrate and processed by the rubbing treatment in a second rubbing direction which is a reverse direction with respect to the first rubbing direction; and
a liquid crystal layer held between the first substrate and the second substrate;
wherein, the slit in the V shape includes;
    a first central portion that extends in a third direction crossing the second direction in a counterclockwise direction at an acute angle with reference to the second direction,
    a first end connected with one end of the first central portion and extending along a fourth direction that crosses the third direction in the counterclockwise direction at an acute angle, a second end connected with the other end of the first central portion and extending in the fourth direction,
a second central portion extending in a fifth direction that crosses the second direction in a clockwise direction at an acute angle,
a third end connected with one end of the second central portion and extending in a sixth direction that crosses the fifth direction in the clockwise direction at an acute angle, and
a fourth end connected with the other end of the second central portion and extending in the sixth direction, and
the first end and the third end are connected.

2. The liquid crystal display device according to claim 1, wherein the respective slits in the shape of V character are formed so that the acute angle between the first end and the third end is arranged on one line in parallel with the first direction.

3. The liquid crystal display device according to claim 1, wherein the first substrate includes a gate line having a first gate electrode and a second gate electrode crossing the semiconductor layer and a source line contacting with the semiconductor layer.

4. The liquid crystal display device according to claim 3, wherein the gate line includes a wiring portion extending in the first direction and having a projected portion toward the pixel between the intersections in which the gate line crosses with a pair of source lines arranged in parallel in the first direction.

5. The liquid crystal display device according to claim 3, wherein the source line includes a first wiring portion extending in the second direction and crossing the gate line, a second wiring portion extending in the third direction in the first central portion, and a third wiring portion extending in the fifth direction in the second central portion.

6. The liquid crystal display device according to claim 1, wherein the first central portion, the first end portion, and the second end portion of the slit is positioned in a upper half portion of the pixel and is formed in a reverse S character shape, and the second central portion, the third end portion, and the forth end portion of the slit is positioned in an under half portion of the pixel and is formed in a S character shape.

7. The liquid crystal display device according to claim 1, wherein the liquid crystal layer is driven by a FFS mode.

8. The liquid crystal display device according to claim 1, wherein the switching element is formed of a double gated TFTs.

9. The liquid crystal display device according to claim 1, wherein a multi domain is formed in one pixel.

10. A liquid crystal display device, comprising:
a first substrate including;
  a switching transistor having a semiconductor layer,
  a first insulating layer arranged on the switching transistor,
  a first electrode formed on the first insulating layer,
  a second insulating layer formed on the first electrode,
  a second electrode arranged on the second insulating layer facing the first electrode and electrically connected with the switching element, the second electrode having a plurality of slits in a V shape arranged along a first direction,
  a first alignment film covering the second electrode and processed by rubbing treatment in a first rubbing direction in parallel with a second direction orthogonally crossing the first direction,
a second substrate including a second alignment film covering a surface thereof facing the first substrate and processed by the rubbing treatment in a second rubbing direction which is a reverse direction with respect to the first rubbing direction; and
a liquid crystal layer held between the first substrate and the second substrate;
wherein, the slit in the V shape includes;
  a first central portion that extends in a third direction crossing the second direction in a counterclockwise direction at an acute angle with reference to the second direction,
  a first end connected with one end of the first central portion and extending along a fourth direction that crosses the third direction in the counterclockwise direction at an acute angle,
  a second end connected with the other end of the first central portion and extending in the fourth direction,
  a second central portion extending in a fifth direction that crosses the second direction in a clockwise direction at an acute angle,
  a third end connected with one end of the second central portion and extending in a sixth direction that crosses the fifth direction in the clockwise direction at an acute angle, and
  a fourth end connected with the other end side of the second central portion and extending in the sixth direction, and the first end and the third end are connected,
wherein the respective slits in the shape of V character are formed so that the acute angle between the first end and the third end is arranged on one line in parallel with the first direction,
wherein the first substrate includes a gate line having a first gate electrode and a second gate electrode crossing the semiconductor layer and a source line contacting with the semiconductor layer, and
wherein the source line includes a first wiring portion extending in the second direction and crossing the gate line, a second wiring portion extending in the third direction in the first central portion, and a third wiring portion extending in the fifth direction in the second central portion.

11. The liquid crystal display device according to claim 10, wherein the gate line includes a wiring portion extending in the first direction and having a projected portion toward the pixel between the intersections in which the gate line crosses with a pair of source lines arranged in parallel in the first direction.

12. The liquid crystal display device according to claim 10, wherein the first central portion, the first end, the second end of the slit is positioned in a upper half portion of the pixel and is formed in a reverse S character shape, and the second central portion, the third end, and the forth end of the slit is positioned in an under half portion of the pixel and is formed in a S character shape.

13. The liquid crystal display device according to claim 10, wherein the liquid crystal layer is driven by a FFS mode.

14. The liquid crystal display device according to claim 10, wherein the switching element is formed of a double gated TFTs.

15. The liquid crystal display device according to claim 10, wherein a multi domain is formed in one pixel.

* * * * *